United States Patent
Regenberg

(10) Patent No.: US 9,855,623 B2
(45) Date of Patent: Jan. 2, 2018

(54) METHOD FOR CONNECTING A TUBULAR CABLE LUG TO A STRAND PRODUCED FROM ALUMINIUM

(71) Applicant: TELSONIC HOLDING AG, Bronschhofen (CH)

(72) Inventor: Claus Regenberg, Zirndorf (DE)

(73) Assignee: TELSONIC HOLDING AG, Bronschhofen (CH)

( * ) Notice: Subject to any disclaimer, the term of this patent is extended or adjusted under 35 U.S.C. 154(b) by 30 days.

(21) Appl. No.: 14/781,686

(22) PCT Filed: Mar. 31, 2014

(86) PCT No.: PCT/EP2014/056472
§ 371 (c)(1),
(2) Date: Oct. 1, 2015

(87) PCT Pub. No.: WO2014/161823
PCT Pub. Date: Oct. 9, 2014

(65) Prior Publication Data
US 2016/0052081 A1    Feb. 25, 2016

(30) Foreign Application Priority Data

Apr. 4, 2013   (DE) .................. 10 2013 205 975
Jun. 26, 2013   (DE) .................. 10 2013 212 331

(51) Int. Cl.
*B23K 20/10*    (2006.01)
*H01R 4/18*    (2006.01)
(Continued)

(52) U.S. Cl.
CPC ............ *B23K 20/10* (2013.01); *B23K 20/002* (2013.01); *B23K 20/106* (2013.01);
(Continued)

(58) Field of Classification Search
CPC .... B23K 20/002; B23K 20/10; B23K 20/106; B23K 20/2333; B23K 2203/08;
(Continued)

(56) References Cited

U.S. PATENT DOCUMENTS 2,586,471 A * 2/1952 Matthysse ................ H01R 4/20
439/877
2,735,997 A * 2/1956 Peterson ................ H01R 4/203
248/902

(Continued)

FOREIGN PATENT DOCUMENTS

CN    102310261 A    1/2012
DE    102007026707 B3    9/2008
(Continued)

OTHER PUBLICATIONS

PCT/IPEA/409, "International Preliminary Report on Patentability for International Application No. PCT/EP2014/056472."
(Continued)

*Primary Examiner* — Erin Saad
*Assistant Examiner* — Carlos Gamino
(74) *Attorney, Agent, or Firm* — Manabu Kanesaka

(57) ABSTRACT

A method for connecting a tubular cable lug produced from a non-ferrous metal to a strand produced from aluminum, includes steps of providing a tubular cable lug having a tubular portion and a connecting portion, providing an ultrasonic welding device having a sonotrode that has a pressure surface and having an anvil that has a mating pressure surface, securing the connecting portion to the anvil by clamping such that the tubular portion faces the mating pressure surface of the anvil, inserting one end of the strand into the tubular portion of the tubular cable lug, bringing the pressure surface into contact with the tubular portion, pressing the pressure surface against the tubular portion such that
(Continued)

Figures 3, 4:
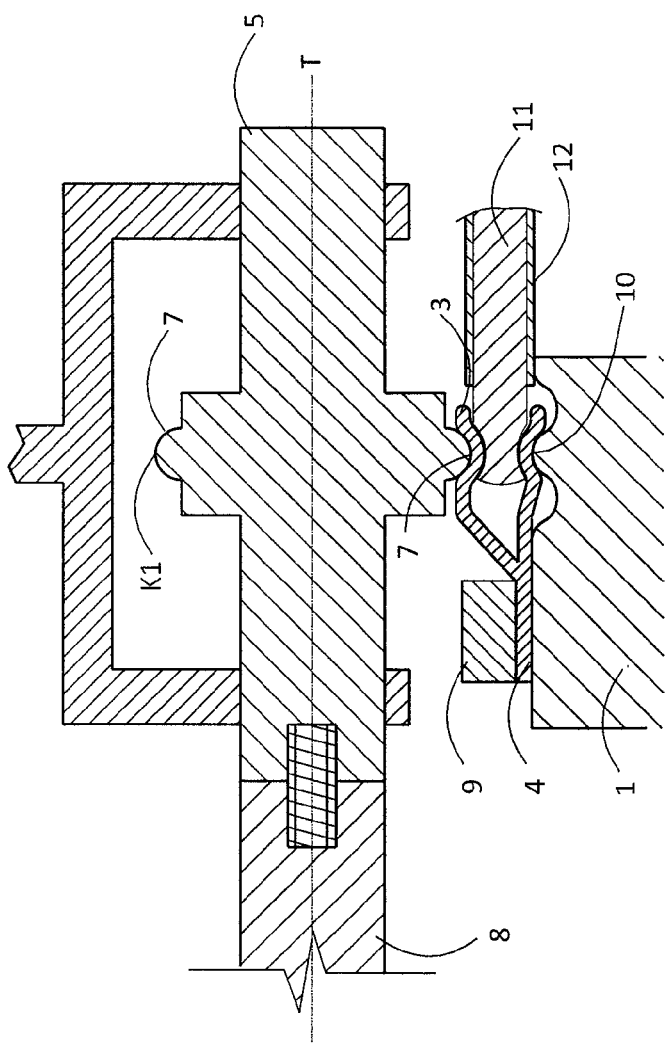

the tubular portion is forced against the mating pressure surface, and generating an ultrasound vibration oriented approximately perpendicular to a tube axis of the tubular portion by means of the sonotrode.

14 Claims, 2 Drawing Sheets

(51) Int. Cl.
  *H01R 4/62*     (2006.01)
  *H01R 43/02*    (2006.01)
  *B23K 20/233*   (2006.01)
  *B23K 20/00*    (2006.01)
  *B23K 103/10*   (2006.01)
  *B23K 103/18*   (2006.01)
  *B23K 101/34*   (2006.01)
  *B23K 103/12*   (2006.01)

(52) U.S. Cl.
  CPC ......... *B23K 20/2333* (2013.01); *H01R 4/187* (2013.01); *H01R 4/625* (2013.01); *H01R 43/0207* (2013.01); *B23K 2201/34* (2013.01); *B23K 2203/10* (2013.01); *B23K 2203/12* (2013.01); *B23K 2203/18* (2013.01)

(58) Field of Classification Search
  CPC ............ B23K 2203/10; B23K 2203/18; H01R 43/0207; H01R 4/187; H01R 4/625
  See application file for complete search history.

(56) References Cited

U.S. PATENT DOCUMENTS

| | | | | |
|---|---|---|---|---|
| 3,175,281 A * | 3/1965 | Elfsten | ................. | B25B 25/005 29/282 |
| 3,717,842 A * | 2/1973 | Douglas, Jr. | ........... | H01R 4/187 156/73.1 |
| 3,931,726 A * | 1/1976 | Grubb | ........................ | B21J 7/26 29/254 |
| 4,317,277 A * | 3/1982 | Bennett | ................ | B23K 11/163 174/94 R |
| 4,890,384 A * | 1/1990 | Shaffer | ................ | H01R 43/058 29/863 |
| 5,011,062 A * | 4/1991 | Nakanishi | .............. | B23K 20/10 228/1.1 |
| 5,195,352 A * | 3/1993 | Grois | ................... | G02B 6/3802 29/751 |
| 6,089,438 A * | 7/2000 | Suzuki | ................... | B23K 20/10 156/580.2 |
| 6,123,556 A * | 9/2000 | Asakura | ................... | H01R 9/05 29/828 |
| 6,568,075 B1 * | 5/2003 | Yamakawa | .......... | H01R 43/058 29/33 M |
| 8,000,803 B2 * | 8/2011 | Araujo | ................. | A61N 1/3752 439/877 |
| 8,726,500 B2 * | 5/2014 | Hagi | ...................... | H01R 43/28 29/861 |
| 8,840,005 B2 * | 9/2014 | Lang | ...................... | B23K 20/10 156/580.2 |
| 2006/0169388 A1 * | 8/2006 | Shimizu | ................. | B23K 20/10 156/73.1 |
| 2007/0257086 A1 * | 11/2007 | Schroeder | .............. | B23K 20/10 228/101 |
| 2008/0265004 A1 | 10/2008 | Stroh | | |
| 2010/0170935 A1 * | 7/2010 | Stroh | ..................... | B23K 20/10 228/110.1 |
| 2011/0220385 A1 | 9/2011 | Lietz et al. | | |
| 2012/0006810 A1 | 1/2012 | Fan et al. | | |
| 2012/0298645 A1 * | 11/2012 | Kleespiess | ............. | H01R 4/029 219/137 R |
| 2013/0062397 A1 * | 3/2013 | Stroh | ................... | B23K 20/106 228/110.1 |
| 2013/0075454 A1 * | 3/2013 | Buettiker | .................. | B06B 3/00 228/110.1 |
| 2013/0112738 A1 | 5/2013 | Ito et al. | | |
| 2014/0014709 A1 * | 1/2014 | Takayashiki | ........... | H01R 4/023 228/110.1 |
| 2014/0144015 A1 | 5/2014 | Mayer et al. | | |
| 2014/0311798 A1 * | 10/2014 | Numata | ................. | H02G 15/06 174/75 R |

FOREIGN PATENT DOCUMENTS

| | | |
|---|---|---|
| DE | 102010029395 A1 | 11/2011 |
| DE | 112011102335 T5 | 4/2013 |
| EP | 0421018 A1 | 4/1991 |
| EP | 2735397 A1 | 5/2014 |
| JP | 02291676 A * | 1/1990 |
| JP | 2004-268069 A | 9/2004 |
| JP | 2011-000611 A | 1/2011 |
| WO | 2010/057753 A1 | 5/2010 |
| WO | 2011/076515 A1 | 6/2011 |
| WO | 2012/008519 A1 | 1/2012 |

OTHER PUBLICATIONS

PCT/ISA/210, "International Search Report for PCT/EP2014/056472", dated Jun. 23, 2014.
PCT/ISA/237, "Written Opinion of the International Searching Authority for PCT/EP2014/056472."
China Patent Office, "Office Action for Chinese Patent Application No. 201480020152.6," dated Dec. 22, 2016.

* cited by examiner

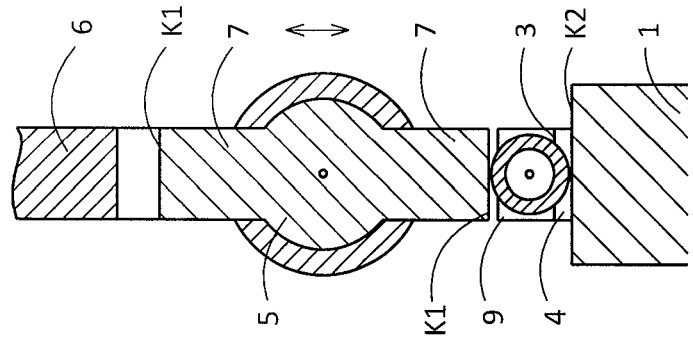
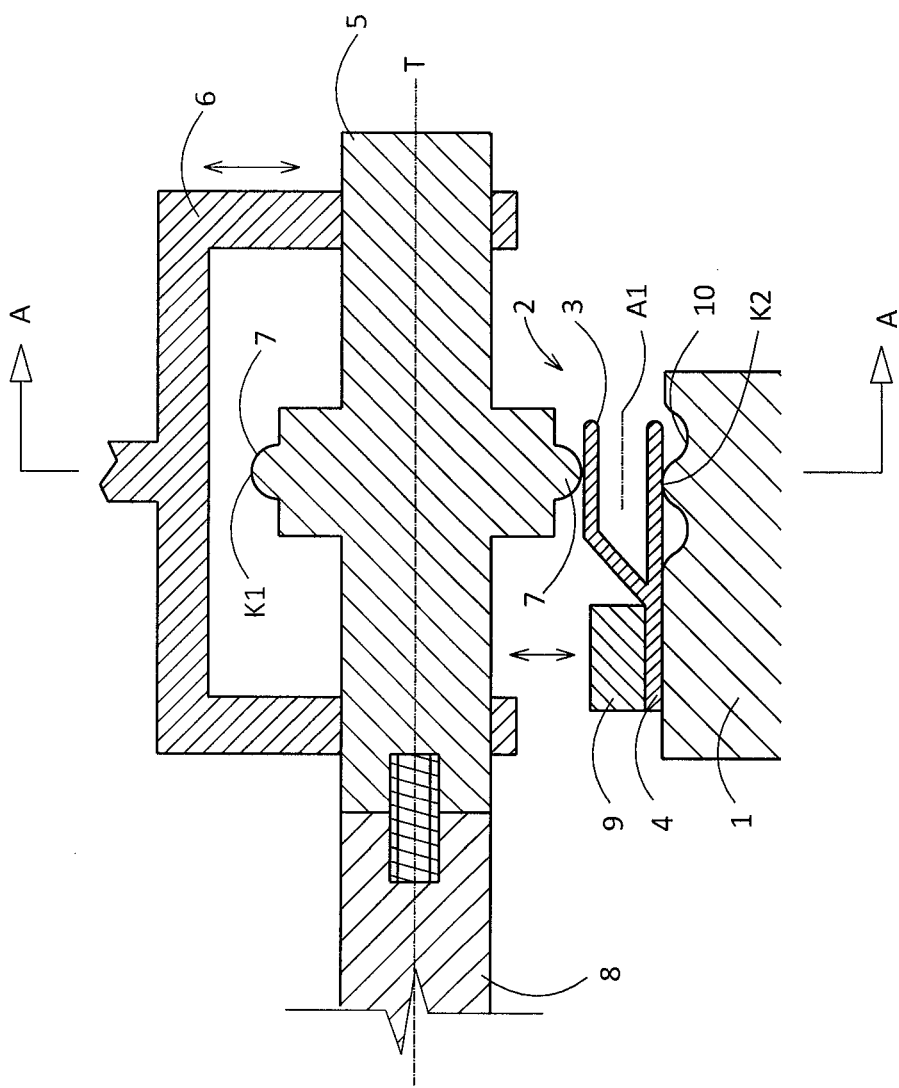

METHOD FOR CONNECTING A TUBULAR CABLE LUG TO A STRAND PRODUCED FROM ALUMINIUM

RELATED APPLICATIONS

The present application is National Phase of International Application No. PCT/EP2014/056472 filed Mar. 31, 2014, and claims priorities from German Application No. 10 2013 205 975.2, filed Apr. 4, 2013 and German Application No. 10 2013 212 331.0, filed Jun. 26, 2013, the disclosure of which is hereby incorporated by reference herein in its entirety.

A method for connecting a connection part produced from a non-ferrous metal to a strand produced from aluminium is known from WO 2010/057753 A1. There, the strand is connected in an integrally bonded manner to the connection part by means of ultrasonic welding. In order to avoid contact corrosion, the strand is provided with a sealant, which melts during the ultrasonic welding and fills out cavities between the individual strand cores. The sealant is an adhesive. The sealant is intended to prevent an infiltration of moisture into the contact region between the aluminium strand and the connection part. It has been shown in practice, however, that the seal effect of the proposed sealant is not permanent.

DE 11 2011 102 335 T5 discloses a method for connecting a strand to a tubular cable lug. The strand is inserted into the tubular cable lug. The individual wires of the strand are then made to melt within the tubular cable lug by means of a heating device. The tubular cable lug is then placed under pressure from the sides, such that the molten metal is lifted in the direction of a sheathing of the strand. —The melting of the strand is energy-intensive and time-consuming.

JP 2011-000611 A discloses a method for welding two flat metal sheets placed one on the other. Both the anvil and the sonotrode have comb-like elevations, which, when the sonotrode is pressed against the anvil, are arranged opposite one another. A particularly high pressure can thus be exerted onto a region that is located between the combs of the anvil and the mutually opposed combs of the sonotrode. A deformation of the sheet metals to be welded to one another is avoided in the case of the known method.

The object of the invention is to overcome the disadvantages according to the prior art. In particular, a method that can be carried out as easily and economically as possible for connecting a tubular cable lug produced from a non-ferrous metal to a strand produced from aluminium is to be specified. In accordance with a further objective of the invention, a contact region between the strand and the tubular cable lug is to be tightly weldable by means of the method, such that an infiltration of moisture is permanently prevented.

This object is achieved by the features of Claim 1. Expedient embodiments of the invention will emerge from the features of Claims 2 to 10.

In accordance with the invention a method for connecting a tubular cable lug produced from a non-ferrous metal to a strand produced from aluminium is proposed, said method comprising the following steps:

providing a tubular cable lug having a tubular portion and a connecting portion extending therefrom, providing an ultrasonic welding device having a sonotrode that has a pressure surface curved in a comb-like manner and having an anvil that has a mating pressure surface curved in a comb-like manner, securing the connecting portion to the anvil by clamping in such a way that the tubular portion faces the mating pressure surface of the anvil, inserting one end of the strand into the tubular portion of the tubular cable lug, bringing the pressure surface into contact with the tubular portion, pressing the pressure surface against the tubular portion such that the tubular portion is forced against the mating pressure surface, and generating an ultrasound vibration oriented approximately perpendicular to a tube axis of the tubular portion by means of the sonotrode, in such a way that the tubular portion is deformed and the aluminium strand inserted therein is welded at least in portions.

With the proposed method it is possible in a surprisingly simple and economical manner to connect a strand produced from aluminium to a tubular cable lug produced from a non-ferrous metal. The connection here is such that the aluminium strand, in a deformation region between the pressure surface and the mating pressure surface (i.e., counter pressure surface), is tightly welded within itself and also to the surrounding tubular portion. An infiltration of moisture into the tubular portion and therefore contact corrosion are permanently avoided due to the tightly welded portion. The connection can be produced with the method according to the invention with short cycle times and relatively low energy expenditure. In particular it is not necessary to melt the strand in the tubular portion in order to produce the connection.

In the ultrasonic welding method known in accordance with the prior art, in order to weld two metal parts, one metal part is fixed in a stationary manner on the anvil. The other metal part is then pressed against the first-mentioned metal part while ultrasound energy is coupled in at the same time. The production of an ultrasonic welded connection produced here is attributed to a high-frequency movement of the other metal part, excited using the sonotrode, relative to the metal part fixed to the anvil. —In the method according to the invention the ultrasound energy by contrast is coupled into the tubular portion fixedly connected to the anvil. Nevertheless, a welded connection is surprisingly achieved between the strand and the tubular portion. When producing the welded connection the individual wires of the strand are welded to one another merely at the surface. A molten phase is produced here, at most to a small extent of less than 20%, preferably less than 15%, particularly preferably less than 10%, of the volume defined by the tubular portion. The molten phase is preferably produced merely in a quantity that is sufficient to fill the spaces between the individual wires of the strand in the region of the tubular portion.

In the sense of the present invention a "tubular cable lug produced from a non-ferrous metal" is understood to mean a tubular cable lug which for example is produced from copper, brass, aluminium, or an alloy containing substantially copper, brass or aluminium. Likewise, a "strand produced from aluminium" is a strand of which the individual wires are produced from aluminium or an alloy containing substantially aluminium. The tubular cable lug is usually produced in one piece. A connecting portion extending from the tubular portion is usually designed in the form of a plate, which may have an aperture.

Since, in accordance with the invention, both the pressure surface of the sonotrode and the opposite mating pressure surface of the anvil are curved in a comb-like manner, the pressure is initially introduced onto the tubular portion via a comb line (i.e., ridge line) connecting the highest points of the comb-like curvature. A largely symmetrical deformation is therefore achieved in the tubular portion, both opposite the pressure surface and opposite the mating pressure surface. By means of the ultrasound energy coupled in via the pressure and mating pressure surfaces curved in a comb-like manner, a plastic flow of the material forming the tubular cable lug and also the strand surrounded by the tubular portion is supported, such that a tight welded connection is produced within the strand and between the strand and the deformed portion of the tubular portion surrounding the strand.

In accordance with an advantageous embodiment a first comb line of the pressure surface and a second comb line of the mating pressure surface are oriented parallel to one another. The first and the second comb line are also located expediently in a movement plane, which is defined by the movement of the first comb line of the pressure surface when the sonotrode is lowered towards the anvil. A particularly effective deformation of the tubular portion and therefore the production of a particularly tight welded connection can therefore be achieved.

The pressure surface and/or the mating pressure surface are expediently each semi-circular. A radius of the pressure surface and/or of the mating pressure surface may be in the range between 2 and 10 mm, preferably between 3 and 8 mm. The embodiment of the pressure and/or mating pressure surface is dependent on the diameter of the tubular portion. In the case of tubular portions with a small diameter, a small radius is selected for the pressure and/or mating pressure surface. The pressure and/or mating pressure surface may also be trapezoidal in profile. In this case the edges of a trapezoidal comb are rounded.

In accordance with a particularly advantageous embodiment the pressure and mating pressure surface are smooth. Since, in contrast to the prior art, in particular the mating pressure surface forming the anvil is smooth, an outer surface of the tubular portion, apart from the deformation caused by the pressure and/or mating pressure surface, advantageously remains undamaged when the connection is produced between the tubular cable lug and the strand. In particular, a layer provided on an outer surface of the tubular cable lug, for example a nickel or tin layer, remains undamaged. The method according to the invention is therefore outstandingly suitable for the connection of strands to a tubular cable lug of which the outer surface is coated with a nickel or tin layer.

In accordance with a further advantageous embodiment the ultrasound vibration is only generated when the tubular portion has been deformed by a predefined indentation depth. The predefined indentation depth may be in the range from 0.5 to 5.0 mm, preferably 2.0 to 4.0 mm. The selection of the indentation depth is dependent on the diameter of the tubular portion. For a tubular portion with a large outer diameter for example of 10 or 12 mm, an indentation depth from 3 to 4 mm is selected by way of example. Due to the deformation of the tubular portion by the predefined indentation depth, the strand is held in the tubular portion by clamping. When ultrasound energy is subsequently coupled in, the axial position of the strand within the tubular portion can no longer be changed by the ultrasound vibration.

In accordance with a further advantageous embodiment, a predefined maximum pressure is exerted onto the tubular portion during the production of the connection. The selection of the maximum pressure is again dependent on the diameter of the tubular portion and also on the wall thickness thereof. The maximum pressure is selected such that a tight welded connection to the strand is achieved and, apart from the deformation of the tubular portion, no damage is caused to the strand, for example crack formation or the like.

In accordance with a further advantageous embodiment a torsion sonotrode is used as sonotrode, at the periphery of which the pressure surface is mounted in such a way that the first comb axis extends approximately perpendicular to a torsion axis of the torsion sonotrode. Such a torsion sonotrode is known for example from DE 10 201 0 029 395 A1. The disclosure of this document is hereby incorporated.

With the proposed torsion sonotrode two pressure surfaces are expediently arranged at the periphery thereof in a mutually opposed arrangement. As a pressure surface becomes worn, it is possible to rotate the torsion sonotrode about the torsion axis through 180° and to thus then continue working with the other pressure surface. Instead of the proposed torsion sonotrode, it is also possible to use a longitudinal sonotrode. In this case the comb line of the pressure surface extends parallel to the vibration direction of the longitudinal sonotrode. In this case as well the comb line of the pressure surface is directed approximately perpendicular to the tube axis of the tubular portion.

An exemplary embodiment of the invention will be explained in greater detail hereinafter on the basis of the drawing, in which:

FIG. 1 shows a sectional view through an arrangement according to the invention, FIG. 2 shows a further sectional view along the line of section A-A in FIG. 1, FIG. 3 shows a sectional view through the arrangement according to FIG. 1 when producing a welded connection to a strand, and FIG. 4 shows a sectional view through a tubular cable lug with a strand welded thereto.

With the arrangement shown in FIGS. 1 to 3 a tubular cable lug designated generally by reference sign 2 is supported on an anvil 1. The tubular cable lug 2 has a tubular portion 3 and a connecting portion 4 extending therefrom. Reference sign A1 designates a tube axis of the tubular portion 3. The connecting portion 4 is advantageously formed in the manner of a plate, which has aperture throughopening (not shown here). A torsion sonotrode 5 is held in a vertical movable pressure device 6. The torsion sonotrode 5 has two mutually opposed pressure surfaces 7, which are each curved in a saddle-like or comb-like manner. A first comb line connecting the highest points of the comb-like curvature is designated by the reference sign K1. This comb line is straight in the shown exemplary embodiment, as is also clear from FIG. 2. The first comb line K1, however, may also be formed in a concave manner, matching the outer diameter of the tubular portion 3.

The torsion sonotrode may be connected for example via a booster 8 to a converter not shown here in greater detail, by means of which the torsion sonotrode 5 can be set in a torsion vibration about a torsion axis designated by the reference sign T. A vertically movable clamping device is designated schematically by the reference sign 9 and can be used to hold the connecting portion 4 on the anvil 1 by clamping. The clamping device 9 in particular may have a pin, which, when the connecting portion 4 is clamped, passes through aperture through-opening provided therein. It is therefore also possible in a simple manner to secure the tubular cable lug 2 on the anvil 1 in a predefined position by clamping, in a reproducible manner.

The anvil 1 has a mating pressure surface 10, which is curved in a saddle-like or comb-like manner. A second comb line K2 connects the highest points of the comb-like curvature of the mating pressure surface 10. As can be seen in particular from FIG. 2, the second comb line K2 in the shown exemplary embodiment is also formed in a straight line. The second comb line K2 may also have a concave curvature.

Both the pressure surface 7 and the mating pressure surface 10 may be semi-circular. A radius of the two surfaces lies expediently in the range between 3 and 8 mm, preferably 4 to 6 mm.

The function of the device or the method that can be carried out therewith will now be explained in greater detail under consideration of FIGS. 3 and 4 together.

The tubular cable lug 2 is first placed on the anvil 1 and is secured by clamping on the anvil 1 by means of the clamping device 9. Here, a lower portion of the tubular portion 3 bears against the, preferably exactly one, mating pressure surface 10, in particular against the second comb line K2 of the mating pressure surface 10. An end E of a strand 11 produced from aluminium is then inserted into the tubular portion 3. The end E is free from an insulation 12 surrounding the strand 11.

The, preferably exactly one, pressure surface 7 is then pressed against the tubular portion 3 by means of the electrically, pneumatically or hydraulically movable pressure device 6, until said tubular portion has deformed by a predefined indentation depth. The predefined indentation depth is selected such that, when this depth is reached, the strand 11 is held in the deformed tubular portion 3 by clamping.

A torsional ultrasound vibration is then coupled into the tubular portion 3 by means of the torsion sonotrode 5, and at the same time pressure is exerted onto the tubular portion 3 by means of the pressure device 6. Consequently, the contours of the pressure surface 7 and also of the mating pressure surface 10 press into the tubular portion 3. Ultrasound energy is coupled into the tubular portion 3, preferably with a predefined power. Consequently, the strand 11 is tightly welded in the portion between the mutually opposed pressure surface 7 and mating pressure surface 10. A welded portion of the strand 11 is designated by the reference sign V.

In order to weld a strand having a line cross section of 35 mm² to a tubular cable lug of which the inner diameter is approximately 8.5 mm, a predefined indentation depth of approximately 3 mm and also a coupled-in ultrasound power in the range from 2,000 to 3,000 W, preferably 2,200 to 2,800 W, are used. A force exerted onto the torsion sonotrode 5 is, for example, 3,000 to 4,000 N, preferably 3,200 to 3,700 N. A radius of the pressure surface 7 and also of the mating pressure surface 10 is approximately 5 mm in this case.

Both the pressure surface 7 and the mating pressure surface 10 are smooth. They have no fluting or other means for indenting a surface of the tubular portion 3. Consequently, a coating provided where necessary on the tubular cable lug 2, for example a tin or nickel layer, is not damaged by the method according to the invention. A coating of this type usually has a layer thickness from 3 to 20 μm.

In the figures the tubular cable lug 2 and the torsion sonotrode 5 are arranged such that a vibration direction of the torsion sonotrode 5 extends approximately perpendicularly to the tube axis A of the tubular cable lug 2. However, it may also be that the torsion sonotrode 5 is arranged relative to the tubular cable lug 2 such that the torsion vibration generated with said sonotrode is oriented approximately parallel to the tube axis A of the tubular cable lug 2.

LIST OF REFERENCE SIGNS 1 anvil
2 tubular cable lug
3 tubular portion
4 connecting portion
5 torsion sonotrode
6 pressure device
7 pressure surface
8 booster
9 clamping device
10 mating pressure surface
11 strand
12 insulation
A1 tube axis
E end
K1 first comb line
K2 second comb line
T torsion axis
V welded portion

The invention claimed is:

1. A method for connecting a tubular cable lug produced from a first metal to a strand produced from a second metal, said method comprising the following steps:
   providing the tubular cable lug having a tubular portion and a connecting portion extending therefrom,
   providing an ultrasonic welding device having a torsion sonotrode that has a curved pressure surface and having an anvil that has a curved counter pressure surface,
   securing the connecting portion in such a way that the tubular portion faces the curved counter pressure surface of the anvil,
   bringing the curved pressure surface into contact with the tubular portion with one end of the strand inserted into the tubular portion,
   pressing the curved pressure surface against the tubular portion such that the tubular portion is forced against the curved counter pressure surface, and
   generating an ultrasound vibration by means of the torsion sonotrode, in such a way that the tubular portion is deformed and the strand inserted therein is welded at least in portions,
   wherein the curved pressure surface is curved in a ridge-like manner and has a first ridge line, the curved counter pressure surface is curved in a ridge-like manner and has a second ridge line,
   wherein the first ridge line of the curved pressure surface and the second ridge line of the curved counter pressure surface are oriented parallel to one another,
   wherein at a periphery of the torsion sonotrode the curved pressure surface is mounted in such a way that the first ridge line extends approximately perpendicular to a torsion axis of the torsion sonotrode, and
   wherein both the curved pressure surface and the curved counter pressure surface have no fluting or other means for indenting a surface of the tubular portion.

2. The method according to claim 1, wherein the curved pressure surface and the curved counter pressure surface are each semi-circular.

3. The method according to claim 1, wherein both the curved pressure surface and the curved counter pressure surface are smooth.

4. The method according to claim 1, wherein an outer surface of the tubular cable lug is coated with a nickel layer or a tin layer.

5. The method according to claim 1, wherein, prior to generating the ultrasound vibration by means of the torsion sonotrode, the tubular portion has been deformed by a predefined indentation depth without ultrasound vibration.

6. The method according to claim 1, wherein a predefined maximum pressure is exerted onto the tubular portion.

7. The method according to claim 1, wherein the first metal is different from the second metal.

8. The method according to claim 1, wherein the connecting portion is secured to the anvil.

9. The method according to claim 8, wherein the connecting portion is secured to the anvil by clamping.

10. The method according to claim 1, wherein the one end of the strand is inserted into the tubular portion of the tubular cable lug between the steps of securing the connecting portion and bringing the curved pressure surface into contact with the tubular portion.

11. The method according to claim 1, wherein the ultrasound vibration is oriented approximately perpendicular to a tube axis of the tubular portion.

12. The method according to claim 1, wherein the curved pressure surface is semi-circular.

13. The method according to claim 1, wherein the curved counter pressure surface is semi-circular.

14. The method according to claim 5, wherein the predefined indentation depth is selected such that, when the predefined indentation depth is reached, the strand is held in the deformed tubular portion of the tubular cable lug by clamping.

\* \* \* \* \*